US011950008B2

(12) United States Patent
Song et al.

(10) Patent No.: US 11,950,008 B2
(45) Date of Patent: Apr. 2, 2024

(54) IMAGE SENSING DEVICE WHICH OUTPUTS PLURAL CLOCK SIGNALS THROUGH RESPECTIVE PLURAL OUTPUT TERMINALS

(71) Applicant: SK hynix Inc., Gyeonggi-do (KR)

(72) Inventors: Jeong Eun Song, Gyeonggi-do (KR); Min Seok Shin, Gyeonggi-do (KR); Yu Jin Park, Gyeonggi-do (KR); Sung Uk Seo, Gyeonggi-do (KR); Sun Young Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 75 days.

(21) Appl. No.: 17/222,508

(22) Filed: Apr. 5, 2021

(65) Prior Publication Data

US 2022/0124276 A1 Apr. 21, 2022

(30) Foreign Application Priority Data

Oct. 15, 2020 (KR) ........................ 10-2020-0133302

(51) Int. Cl.
*H04N 25/71* (2023.01)
*H04N 25/677* (2023.01)

(52) U.S. Cl.
CPC ......... *H04N 25/745* (2023.01); *H04N 25/677* (2023.01)

(58) Field of Classification Search
CPC .... H04N 25/745; H04N 25/677; H04N 25/70; H04N 25/705; H04N 25/75; G01S 17/894
USPC ........................................................ 348/294
See application file for complete search history.

(56) References Cited

U.S. PATENT DOCUMENTS

| | | | | |
|---|---|---|---|---|
| 6,570,429 | B1 * | 5/2003 | Hellriegel | G06F 1/10 327/295 |
| 6,731,335 | B1 | 5/2004 | Kim et al. | |
| 2007/0286323 | A1 * | 12/2007 | Shimobeppu | G06F 1/10 375/376 |
| 2008/0224959 | A1 * | 9/2008 | Chou | G09G 3/22 345/75.1 |
| 2010/0097370 | A1 * | 4/2010 | Lin | G09G 3/3677 345/99 |
| 2014/0375851 | A1 | 12/2014 | Lee et al. | |
| 2016/0119611 | A1 * | 4/2016 | Hall | G01S 7/497 348/46 |

FOREIGN PATENT DOCUMENTS

| | | |
|---|---|---|
| CN | 110933342 A | 3/2020 |
| KR | 10-2061699 | 1/2020 |

OTHER PUBLICATIONS

Office Action of the Chinese Patent Application No. 202111049300.5 issued by the Chinese Patent Office dated Feb. 6, 2024.

* cited by examiner

*Primary Examiner* — Usman A Khan
(74) *Attorney, Agent, or Firm* — IP & T GROUP LLP

(57) ABSTRACT

Disclosed is an image sensing device including a first clock distributor suitable for receiving a first input dock signal through a first input terminal, and outputting a plurality of first output clock signals through a plurality of first output terminals, and a first conductive line coupled in common to the plurality of first output terminals.

11 Claims, 6 Drawing Sheets

IMAGE SENSING DEVICE WHICH OUTPUTS PLURAL CLOCK SIGNALS THROUGH RESPECTIVE PLURAL OUTPUT TERMINALS

CROSS-REFERENCE TO RELATED APPLICATION(S)

This application claims priority under 35 U.S.C. § 119 to Korean Patent Application No. 10-2020-0133302, filed on Oct. 15, 2020, the disclosure of which is incorporated herein by reference in its entirety.

BACKGROUND

1 Field

Various embodiments of the present disclosure relate to a semiconductor design technique, and more particularly, to an image sensing device.

2. Description of the Related Art

Image sensing devices capture images using the property of a semiconductor which reacts to light. Generally, there are two types of image sensing devices: charge-coupled device (CCD) image sensing devices and complementary metal-oxide semiconductor (CMOS) image sensing devices. Recently, CMOS image sensing devices are widely used because the CMOS image sensing devices allow both analog and digital control circuits to be directly implemented on a single integrated circuit (IC).

SUMMARY

Various embodiments of the present disclosure are directed to an image sensing device from which timing skew between dock signals used when a depth is measured is suppressed.

In accordance with an embodiment, an image sensing device may include: a first clock distributor suitable for receiving a first input clock signal through a first input terminal, and outputting a plurality of first output clock signals through a plurality of first output terminals; and a first conductive line coupled in common to the plurality of first output terminals.

The first clock distributor may include: a first clock tree coupled between the first input terminal and a plurality of first distribution terminals; and a plurality of first output drivers coupled between the plurality of first distribution terminals and the plurality of first output terminals.

The image sensing device may further include a second conductive line coupled in common to the plurality of first distribution terminals.

The image sensing device may further include: a plurality of second conductive lines coupled to a plurality of first groups, respectively, each of the first groups having a respective subset of the plurality of first distribution terminals; and a plurality of first couplers suitable for selectively coupling the plurality of second conductive lines based on a plurality of first control signals.

In accordance with an embodiment, an image sensing device may include: a first dock distributor suitable for receiving a first input dock signal through a first input terminal, and outputting a plurality of first output dock signals through a plurality of first output terminals; a plurality of first conductive lines coupled to a plurality of first groups, respectively, each of the first groups having a respective subset of the plurality of first output terminals; and a plurality of first couplers suitable for selectively coupling the plurality of first conductive lines based on a plurality of first control signals.

The first dock distributor may include: a first dock tree coupled between the first input terminal and a plurality of first distribution terminals; and a plurality of first output drivers coupled between the plurality of first distribution terminals and the plurality of first output terminals.

The image sensing device may further include a second conductive line coupled in common to the plurality of first distribution terminals.

The image sensing device may further include: a plurality of second conductive lines coupled to a plurality of second groups, each of the second groups having a respective subset of the plurality of first distribution terminals; and at least one second coupler suitable for selectively coupling the plurality of second conductive lines based on a plurality of second control signals.

In accordance with an embodiment, an image sensing device may include: a first clock tree suitable for receiving a first input clock signal through a first input terminal, and outputting a plurality of first clock signals through a plurality of first distribution terminals; a first conductive line coupled in common to the plurality of first distribution terminals; and a plurality of first output drivers suitable for receiving the plurality of first clock signals, and outputting a plurality of first output clock signals through a plurality of first output terminals.

The image sensing device may further include: a second clock tree suitable for receiving a second input clock signal, which has a different phase from the first input clock signal, through a second input terminal, and outputting a plurality of second clock signals through a plurality of second distribution terminals; a second conductive line coupled in common to the plurality of second distribution terminals; and a plurality of second output drivers suitable for receiving the plurality of second clock signals, and outputting a plurality of second output clock signals through a plurality of second output terminals.

In accordance with an embodiment, an image sensing device may include: a clock distributor suitable for generating output clock signals having a phase based on an input clock signal and outputting the output clock signals through respective output terminals; a pixel array including pixels each suitable for generating charges corresponding to incident light from a subject in response to a corresponding output clock signal to generate a pixel signal based on the charges; and an image processor suitable for generating depth map information for the subject based on the pixel signals, wherein the output terminals are divided into output groups, wherein the output terminals of each output group are coupled to a conductive line, and wherein neighboring output groups are selectively coupled to each other.

DETAILED DESCRIPTION

Various embodiments are described below with reference to the accompanying drawings to describe in detail the present disclosure to enable those skilled in art to which the present disclosure pertains to practice and easily carry out the present disclosure. Throughout the specification, reference to "an embodiment" or the like is not necessarily to only one embodiment, and different references to any such phrase are not necessarily to the same embodiment(s). The term "embodiments" when used herein does not necessarily refer to all embodiments.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have one or more other elements, unless otherwise mentioned. In the description throughout the specification, some components are described in singular forms, but the present disclosure is not limited thereto, and it will be understood that the components may be formed in plural.

Figure 1:
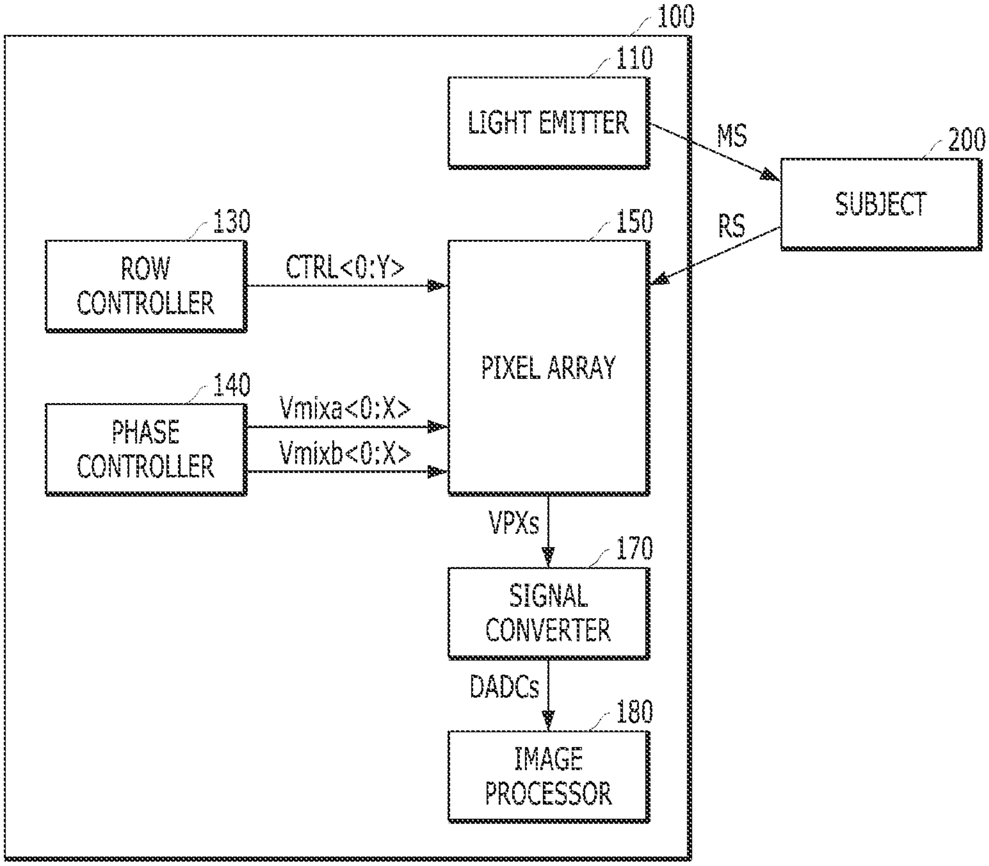
FIG. 1 is a block diagram illustrating an image sensing device in accordance with an embodiment.

FIG. 1 is a block diagram illustrating an image sensing device 100 in accordance with an embodiment.

Referring to FIG. 1, the image sensing device 100 may generate depth map information indicating its distance, i.e., a depth, from a subject 200 using a time of flight (ToF) method. For example, the image sensing device 100 may generate or calculate the depth map information by detecting a phase difference between emitted light MS that is emitted to the subject 200 and incident light RS that is reflected from the subject 200. For example, the image sensing device 100 may include a light emitter 110, a row controller 130, a phase controller 140, a pixel array 150, a signal converter 170 and an image processor 180.

The light emitter 110 may output the emitted light MS to the subject 200. For example, the emitted light MS may be a periodic signal that periodically toggles.

The row controller 130 may generate a plurality of row control signals CTRL<0:Y> for controlling the pixel array 150 for each row. Herein, "Y" may correspond to the number of rows of the pixel array 150. For example, the row controller 130 may generate first row control signals CTRL<0> for controlling pixels arranged in a first row of the pixel array 150, and generate $(Y+1)^{th}$ row control signals CTRL<Y> for controlling pixels arranged in a $(Y+1)^{th}$ row of the pixel array 150.

The phase controller 140 may generate a plurality of first output dock signals Vmixa<0:X> and a plurality of second output dock signals Vmixb<0:X>. Herein, "X" may correspond to the number of columns of the pixel array 150, The first output clock signals Vmixa<0:X> may have the same phase, the second output clock signals Vmixb<0:X> may have the same phase, and the first output clock signals Vmixa<0:X> and the second output clock signals Vmixb<0:X> may have different phases. For example, the first output clock signals Vmixa<0:X> and the second output clock signals Vmixb<0:X> may have a phase difference of 180 degrees.

The pixel array 150 may generate a plurality of pixel signals VPXs based on the incident light RS, the row control signals CTRL<0:Y>, the first output clock signals Vmixa<0:X> and the second output clock signals Vmixb<0:X>. The pixel array 150 may include a plurality of unit pixels for measuring the depth from the subject 200. The plurality of unit pixels may be arranged in row and column directions. Each of the unit pixels may generate first and second pixel signals based on a corresponding row control signal CTRL<#>, a corresponding first output clock signal Vmixa<#>, a corresponding second output clock signal Vmixb<#> and the incident light RS, as indicated in FIG. 2.

The signal converter 170 may generate a plurality of digital signals DADCs based on the plurality of pixel signals VPXs. For example, the signal converter 170 may include an analog-to-digital converter (ADC).

The image processor 180 may generate the depth nap information indicating the depth from the subject 200, based on the plurality of digital signals DADCs. For example, the image processor 180 may generate or calculate the depth map information by performing a subtraction process on first and second digital signals corresponding to the first and second pixel signals generated from each of the unit pixels.

Figure 2:
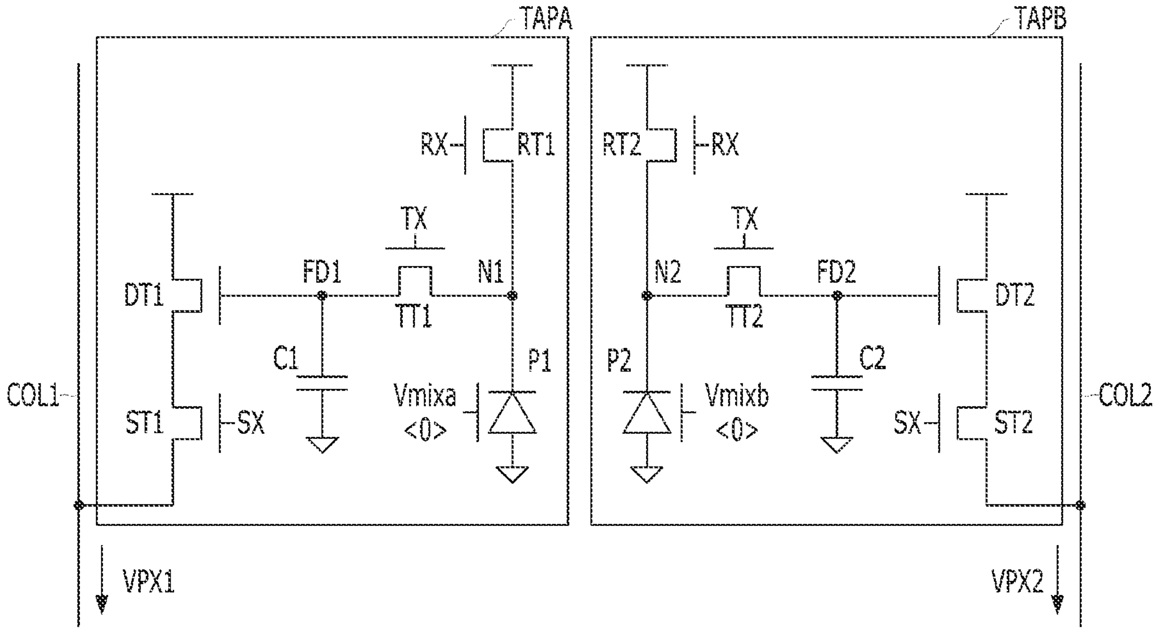
FIG. 2 is a circuit diagram illustrating a portion of a pixel of a pixel array.

FIG. 2 is a circuit diagram illustrating a portion of the pixel array 150 illustrated in FIG. 1. That is, a circuit diagram of a unit pixel is illustrated in FIG. 2.

Referring to FIG. 2, the unit pixel may include a pair of pixels. For example, the pair of pixels may include a first pixel TAPA and a second pixel TAPB.

The first pixel TAPA may generate a first pixel signal VPX1 based on a reset signal RX, a transmission signal TX, a selection signal SX and the first output clock signal Vmixa<0>. The reset signal RX, the transmission signal TX and the selection signal SX may be included in any one row control signal CTRL<#> of the plurality of row control signals CTRL.<0:Y> described above. For example, the first pixel TAPA may include a first sensing circuit P1, a first reset circuit RT1, a first transmission circuit TT1, a first charge storage circuit C1, a first driving circuit DT1 and a first selection circuit ST1.

The first sensing circuit P1 may be coupled between a first node N1 and a first low voltage terminal. The first sensing circuit P1 may generate first charges, which correspond to the incident light RS, based on the first output control signal Vmixa<0>. The first sensing circuit P1 may include a photodiode.

The first reset circuit RT1 may be coupled between a first high voltage terminal and the first node N1. The first reset circuit RT1 may reset the first sensing circuit P1 and the first charge storage circuit C1 based on the reset signal RX.

The first transmission circuit TT1 may be coupled between the first node N1 and a first floating diffusion node FD1. The first transmission circuit TT1 may reset the first charge storage circuit C1 and transmit the first charges, which are generated from the first sensing circuit P1, to the first charge storage circuit C1, based on the transmission signal TX.

The first charge storage circuit C1 may be coupled between the first floating diffusion node FD1 and the first low voltage terminal. The first charge storage circuit C1 may store the first charges. For example, the first charge storage circuit C1 may be a parasitic capacitor.

The first driving circuit DT1 may be coupled between the first high voltage terminal and the first selection circuit ST1. The first driving circuit DT1 may drive a first column line COL1 with a high voltage, which is supplied through the first high voltage terminal, based on a voltage loaded on the first floating diffusion node FD1.

The first selection circuit ST1 may be coupled between the first driving circuit DT1 and the first column line COL1. The first selection circuit ST1 may selectively couple the first driving circuit DT1 to the first column line COL1 based on the selection signal SX. The first selection circuit ST1 may output the first pixel signal VPX1 through the first column line COL1.

The second pixel TAPB may generate a second pixel signal VPX2 based on a reset signal RX, a transmission signal TX, a selection signal SX and the second output clock signal Vmixb<0>. For example, the second pixel TAPB may include a second sensing circuit P2, a second reset circuit RT2, a second transmission circuit TT2, a second charge storage circuit C2, a second driving circuit DTZ and a second selection circuit ST2.

The second sensing circuit P2 may be coupled between a second node N2 and the first low voltage terminal. The second sensing circuit P2 may generate second charges, which correspond to the incident light RS, based on the second output clock signal Vmixb<0>. The second sensing circuit P2 may include a photodiode.

The second reset circuit RT2 may be coupled between the first high voltage terminal and the second node N2. The second reset circuit RT2 may reset the second sensing circuit P2 and the second charge storage circuit C2 based on the reset signal RX.

The second transmission circuit TT2 may be coupled between the second node N2 and a second floating diffusion node FD2. The second transmission circuit 112 may reset the second charge storage circuit C2 and transmit the second charges, which are generated from the second sensing circuit P2, to the second charge storage circuit C2, based on the transmission signal TX.

The second charge storage circuit C2 may be coupled between the second floating diffusion node FD2 and the first low voltage terminal. The second charge storage circuit C2 may be a parasitic capacitor.

The second driving circuit DT2 may be coupled between the first high voltage terminal and the second selection circuit ST2. The second driving circuit DT2 may drive a second column line COL2 with the high voltage, which is supplied through the first high voltage terminal, based on a voltage loaded on the second floating diffusion node FD2.

The second selection circuit ST2 may be coupled between the second driving circuit DT2 and the second column line COL2. The second selection circuit ST2 may selectively couple the second driving circuit DT2 to the second column line COL2 based on the selection signal SX. The second selection circuit ST2 may output the second pixel signal VPX2 through the second column line COL2.

Figure 3:
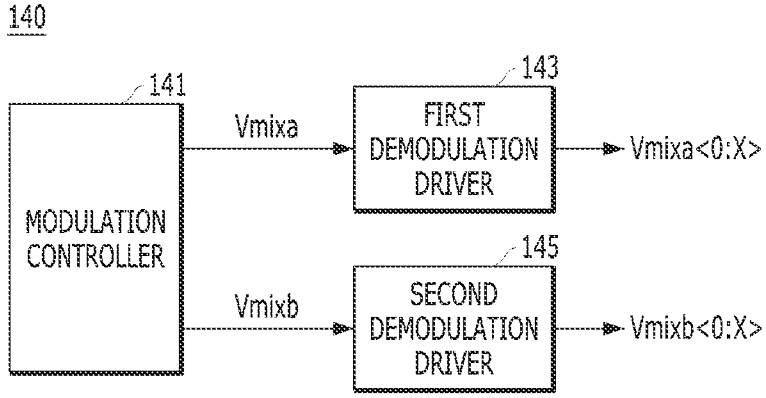
FIG. 3 is a block diagram illustrating an example of a phase controller, such as that illustrated in FIG. 1.

FIG. 3 is a block diagram illustrating an example of the phase controller 140 illustrated in FIG. 1.

Referring to FIG. 3, the phase controller 140 may include a modulation controller 141, a first demodulation driver 143 and a second demodulation driver 145.

The modulation controller 141 may generate first and second input dock signals Vmixa and Vmixb having different phases. For example, the first and second input clock signals Vmixa and Vmixb may have a phase difference of 180 degrees.

The first demodulation driver 143 may generate the plurality of first output clock signals Vmixa<0:X> based on the first input clock signal Vmixa. For example, the first demodulation driver 143 as a first clock distributor may generate the plurality of first output clock signals Vmixa<0:X> having the same phase as the first input clock signal Vmixa.

The second demodulation driver 145 may generate the plurality of second output clock signals Vmixb<0:X> based on the second input clock signal Vmixb. For example, the second demodulation driver 145 as a second clock distributor may generate the plurality of second output clock signals Vmixb<0:X> having the same phase as the second input clock signal Vmixb.

Since the first and second demodulation drivers 143 and 145 may be designed in the same manner, the first demodulation driver 143 is representatively described below.

Figure 4:
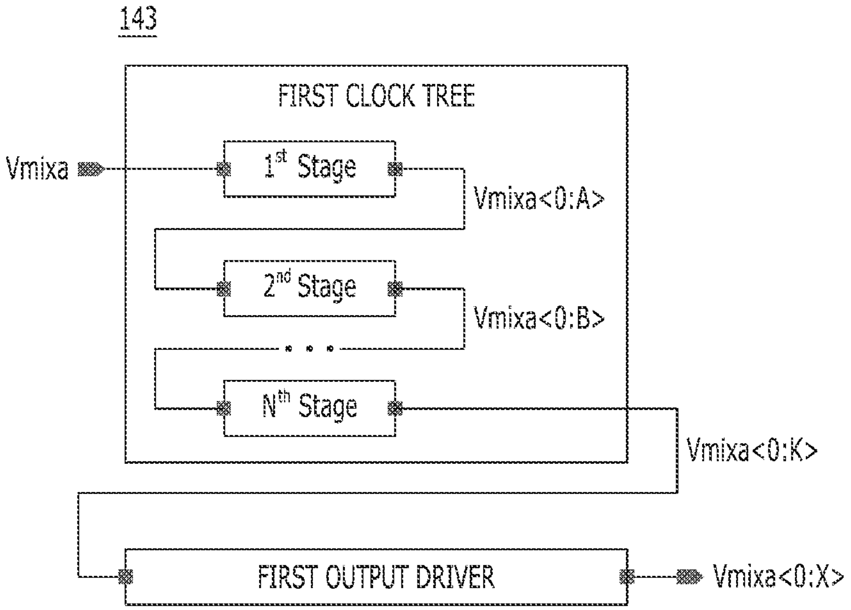
FIG. 4 is a block diagram illustrating a first demodulation driver, such as that illustrated in FIG. 3.

FIG. 4 is a block diagram illustrating the first demodulation driver 143 illustrated in FIG. 3.

Referring to FIG. 4, the first demodulation driver 143 may include a first dock tree and a plurality of first output drivers.

The first dock tree may include a plurality of stages $1^{st}$ Stage to $N^{th}$ Stage (where "N" is an integer greater than 3). For example, the first stage ($1^{st}$ Stage) may receive the first input clock signal Vmixa, and generate at least one dock signal Vmixa<0:A> (where "A" is an integer equal to or greater than 0). The second stage ($2^{nd}$ Stage) may receive the plurality of dock signals Vmixa<0:A> outputted from the $1^{st}$ Stage, and generate a plurality of dock signals Vmixa<0:B> (where "B" is an integer greater than "A"). The $N^{th}$ stage ($N^{th}$ Stage) may receive a plurality of dock signals outputted from an $(N-1)^{th}$ stage ($(N-1)^{th}$ Stage), and generate a plurality of dock signals Vmixa<0:K> (where "K" is an integer greater than "B").

The plurality of first output drivers may receive the plurality of dock signals Vmixa<0:K> outputted from the first dock tree, and generate the plurality of first output dock signals Vmixa<0:X>.

Figure 5:
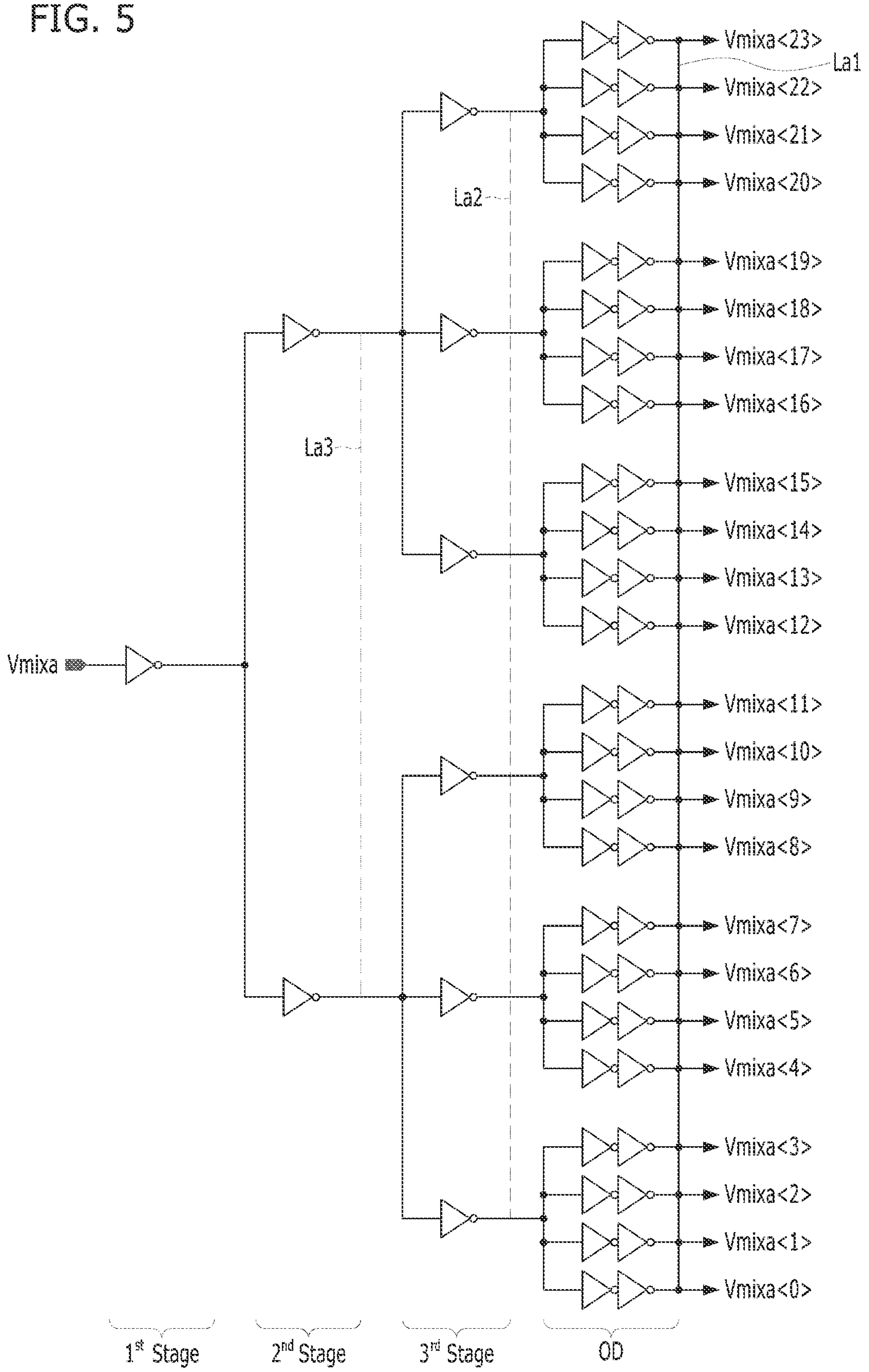
FIG. 5 is a circuit diagram illustrating conductive line(s) together with first to third stages and first output drivers, such as illustrated in FIG. 4.

FIG. 5 is a circuit diagram illustrating at least one conductive line together with the first dock tree and the plurality of first output drivers OD illustrated in FIG. 4. By way of example, FIG. 5 illustrates that the first clock tree includes the $1^{st}$ Stage to $3^{rd}$ Stage, that is, "N" is 3.

Referring to FIG. 5, the $1^{st}$ Stage may be coupled between one input terminal and one output terminal. The $1^{st}$ Stage may include a first inverter coupled between the one input terminal and the one output terminal. In other words, the $1^{st}$ Stage may be allocated one output terminal, i.e., one distribution terminal, per one input terminal. In this case, the $1^{st}$ Stage may output a first clock signal. The first dock signal may correspond to the at least one dock signal Vmixa<0:A> described above, that is, "A" is 0.

The $2^{nd}$ Stage may be coupled between one input terminal, which is coupled to the one output terminal of the $1^{st}$ Stage, and two output terminals. The $2^{nd}$ Stage may include first and second inverters coupled in parallel between the one input terminal and the two output terminals. In other words, the $2^{nd}$ Stage may be allocated two output terminals per one input terminal. In this case, the $2^{nd}$ Stage may output first and second dock signals. The first and second dock signals may correspond to the plurality of dock signals Vmixa<0:B>, respectively, described above, that is, "B" is 1.

The $3^{rd}$ Stage may be coupled between two input terminals, which are respectively coupled to the two output terminals of the $2^{nd}$ Stage, and six output terminals. The $3^{rd}$ Stage may include first to third inverters coupled in parallel between one of the two input terminals and three of the six output terminals, and fourth to sixth inverters coupled in parallel between the other input terminal and the other three output terminals. In other words, the $3^{rd}$ Stage may be allocated three output terminals per one input terminal. In this case, the $3^{rd}$ Stage may output first to sixth dock signals. The first to sixth dock signals may correspond to the plurality of dock signals Vmixa<0:K>, respectively, described above, that is, "K" is 5.

In an embodiment, each of the $1^{st}$ Stage to $3^{rd}$ Stage may include one inverter for each divaricate path, i.e., branch. However, the present disclosure is not limited thereto, and each of the $1^{st}$ Stage to $3^{rd}$ Stage may include two or more inverters, depending on design. For example, when each of the $1^{st}$ Stage to $3^{rd}$ Stage includes two or more inverters, the two or more inverters may be coupled in series. In addition, the number of paths branching from each of the $1^{st}$ Stage to $3^{rd}$ Stage may be variously changed according to design.

The plurality of first output drivers OD may be coupled between six input terminals, which are respectively coupled to the six output terminals of the $3^{rd}$ Stage, and 24 output terminals. The plurality of first output drivers OD may be allocated four output terminals per one input terminal. In this case, the plurality of first output drivers OD may output first to $24^{th}$ output dock signals Vmixa<0:23>. The first to $24^{th}$ output dock signals Vmixa<0:23> may correspond to the plurality of first output clock signals Vmixa<0:X>, respectively, described above, that is, "X" is 23.

In an embodiment, each of the plurality of first output drivers OD may include two inverters, coupled in series to each other, for each divaricate path, i.e., branch. However, the present disclosure is not limited thereto, and each of the first output drivers OD may include one inverter or three or more inverters coupled in series to one another, depending on design. In addition, the number of paths branching from each of the first output drivers may be variously changed according to design.

According to an embodiment, the output terminals of the plurality of first output drivers OD, that is, the 24 output terminals may be coupled in common by a first conductive line La1. Accordingly, a timing skew that occurs among the first to $24^{th}$ output dock signals Vmixa<0:23> may be suppressed by making substantially the same transition timings of the first to $24^{th}$ output dock signals Vmixa<0:23>.

For reference, since the plurality of first output drivers OD may have different RC delays reflected in respective branched paths and the respective inverters included in the plurality of output drivers OD may have different characteristics, for example, process and voltage variations, the timing skew may occur among the first to the $24^{th}$ output clock signals Vmixa<0:23>. However, since the 24 output terminals are coupled in common by the first conductive line La1 as described by way of example, the transition timings of the first to $24^{th}$ output clock signals Vmixa<0:23> may become almost the same. For example, among the plurality of first output drivers OD, a first output driver group that outputs output clock signals each having relatively early transition timing and a second output driver group that outputs output clock signals each having relatively late transition timing may collide or interfere with each other during a period in which the timing skew occurs. When the first output driver group and the second output driver group collide with each other, the transition timings of the output dock signals outputted from the first output driver group may be relatively delayed, and the transition timings of the output signals outputted from the second output driver group may be relatively advanced. Accordingly, the transition timings of the first to $24^{th}$ output clock signals Vmixa<0:23> may become almost the same.

According to an embodiment, the output terminals of the $3^{rd}$ Stage, that is, the six output terminals may be coupled in common by a second conductive line La2. Accordingly, timing skew that occurs among the first to sixth clock signals may be suppressed by making substantially the same transition timings as the first to sixth clock signals outputted from the $3^{rd}$ Stage. The timing skew that occurs among the first to sixth clock signals is suppressed, which makes it possible to suppress the timing skew occurring among the first to $24^{th}$ output clock signals Vmixa<0:23>.

According to an embodiment, the output terminals of the $2^{nd}$ Stage, that is, the two output terminals may be coupled in common by a third conductive line La3. Accordingly, timing skew that occurs between the first and second clock signals may be suppressed by making substantially the same transition timings as the first and second clock signals outputted from the $2^{nd}$ Stage. The timing skew that occurs between the first and second clock signals is suppressed, which makes it possible to suppress the timing skew occurring among the first to $24^{th}$ output clock signals Vmixa<0:23>.

According to an embodiment, the output terminals of at least one of the $2^{nd}$ Stage, the $3^{rd}$ Stage and the plurality of first output drivers OD may be coupled in common by at least one of the first to third conductive lines La1 to La3. Accordingly, all of the timing skew that occurs between the first and second clock signals, the timing skew that occurs among the first to sixth clock signals and the timing skew that occurs among the first to $24^{th}$ output clock signals Vmixa<0:23> may be suppressed.

Figure 6:
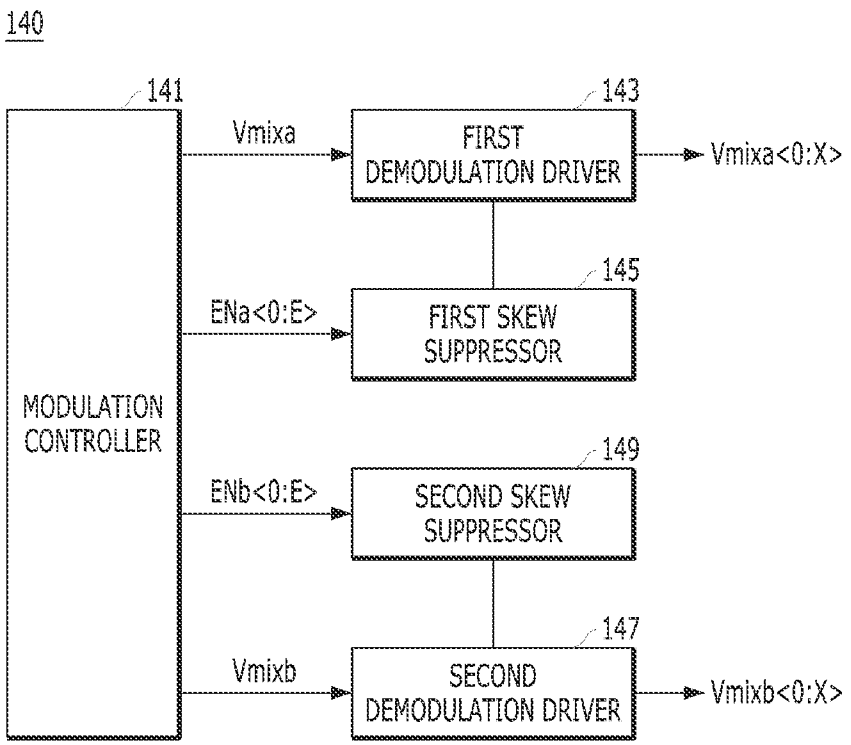
FIG. 6 is a block diagram illustrating another example of a phase controller, such as that illustrated in FIG. 1.

FIG. 6 is a block diagram illustrating another example of the phase controller 140 illustrated in FIG. 1.

Referring to FIG. 6, the phase controller 140 may include a modulation controller 141, a first demodulation driver 143, a first skew suppressor 145, a second demodulation driver 147 and a second skew suppressor 149.

The modulation controller 141 may generate first and second input dock signals Vmixa and Vmixb having different phases. For example, the first and second input dock signals Vmixa and Vmixb may have a phase difference of 180 degrees. The modulation controller 141 may generate a plurality of first control signals ENa<0:E> for controlling the first skew suppressor 145 and a plurality of second control signals ENb<0:E> for controlling the second skew suppressor 149. Activation of each of the first control signals ENa<0:E> may be determined according to the degree of timing skew occurring between the plurality of first output dock signals Vmixa<0:X>, and activation of each of the second control signals ENb<0:E> may be determined according to the degree of timing skew occurring between the plurality of second output dock signals Vmixb<0:X>. The degree of timing skew occurring between the plurality of first output clock signals (Vmixa<0:X>) and the degree of timing skew occurring between the plurality of second output dock signals (Vmixb<0:X>) may be determined by a test or simulation. In other words, the plurality of first control signals ENa<0:E> and the plurality of second control signals ENb<0:E> may be activated or deactivated according to results of the test or simulation. An embodiment describes an example in which the plurality of first control signals ENa<0:E> and the plurality of second control signals ENb<0:E> are generated from the modulation controller 141. However, the present disclosure is not limited thereto, and the plurality of first control signals ENa<0:E> and the plurality of second control signals ENb<0:E> may be generated from a timing controller (not illustrated), which is included in the image sensing device 100 and controls general operations of the image sensing device 100, or from an external device of the image sensing device 100, for example, a control device.

The first demodulation driver 143 may generate the plurality of first output clock signals Vmixa<0:X> based on the first input dock signal Vmixa. For example, the first demodulation driver 143 as a first dock distributor may generate the plurality of first output dock signals Vmixa<0:X> having the same phase as the first input dock signal Vmixa.

The first skew suppressor 145 may be coupled to the first demodulation driver 143. The first skew suppressor 145 may suppress timing skew that occurs between all or some of the plurality of first output clock signals Vmixa<0:X>, based on the plurality of first control signals ENa<0:E>.

The second demodulation driver 147 may generate the plurality of second output clock signals Vmixb<0:X> based on the second input clock signal Vmixb. For example, the second demodulation driver 147 as a second clock distributor may generate the plurality of second output clock signals Vmixb<0:X> having the same phase as the second input clock signal Vmixb.

The second skew suppressor 149 may be coupled to the second demodulation driver 147. The second skew suppressor 149 may suppress timing skew that occurs between all or some of the plurality of second output clock signals Vmixb<0:X>, based on the plurality of second control signals ENb<0:E>.

Since the first and second demodulation drivers 143 and 147 may be designed in the same manner and the first and second skew suppressors 145 and 149 may be designed in the same manner, the first demodulation driver 143 and the first skew suppressor 145 are representatively described below.

Figure 7:
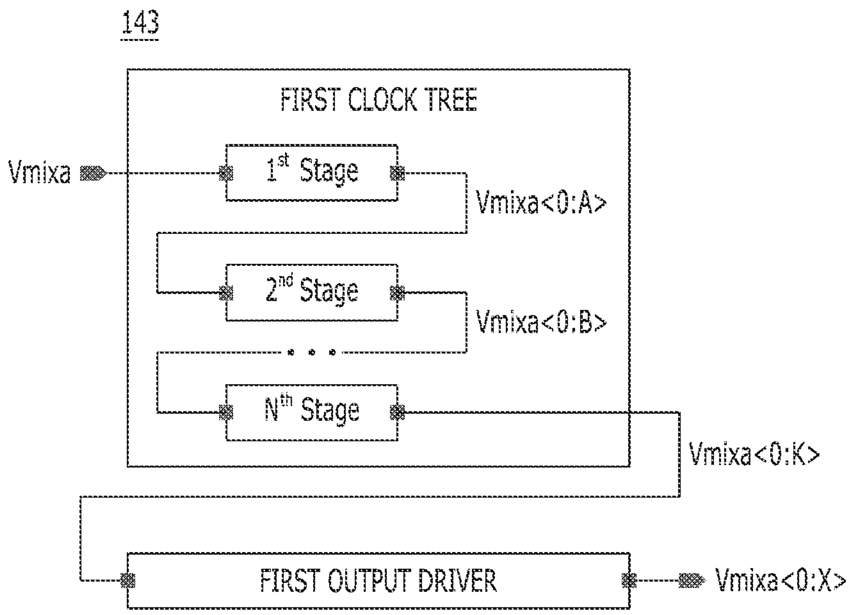
FIG. 7 is a block diagram illustrating a first demodulation driver, such as that illustrated in FIG. 6.

FIG. 7 is a block diagram illustrating the first demodulation driver 143 illustrated in FIG. 6.

Referring to FIG. 7, the first demodulation driver 143 may include a first dock tree and a plurality of first output drivers.

The first dock tree may include a plurality of stages $1^{st}$ Stage to $N^{th}$ Stage (where "N" is an integer greater than 3), For example, the $1^{th}$ Stage may receive the first input dock signal Vmixa, and generate at least one dock signal Vmixa<0:A> (where "A" is an integer equal to or greater than 0). The $2^{nd}$ Stage may receive the plurality of dock signals Vmixa<0:A> outputted from the $1^{st}$ Stage, and generate a plurality of clock signals Vmixa<0:B> (where "B" is an integer greater than "A"), The $N^{th}$ stage $N^{th}$ Stage may receive a plurality of clock signals outputted from an $(N-1)^{th}$ stage $(N-1)^{th}$ Stage, and generate a plurality of clock signals Vmixa<0:K> (where "K" is an integer greater than "B").

Figure 8:
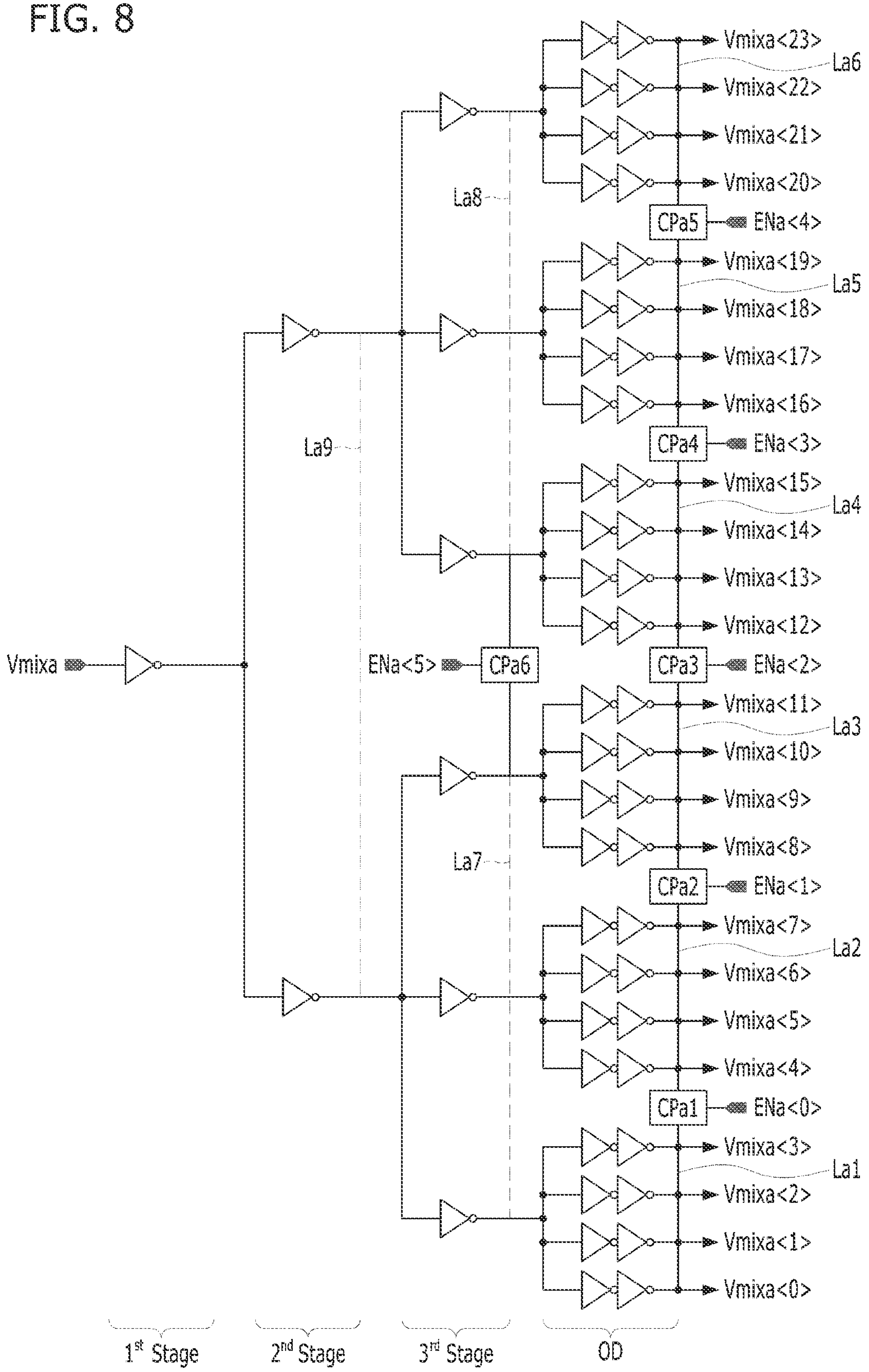
FIG. 8 is a circuit diagram illustrating conductive line(s) together with first to third stages, first output drivers and a first skew suppressor, such as illustrated in FIGS. 6 and 7.

The plurality of first output drivers may receive the plurality of dock signals Vmixa<0:K> outputted from the first dock tree, and generate the plurality of first output dock signals Vmixa<0:X>, FIG. 8 is a circuit diagram illustrating at least one conductive line together with the first clock tree and the plurality of first output drivers OD illustrated in FIG. 6 and the first skew suppressor 145 illustrated in FIG. 5. By way of example, FIG. 8 illustrates that the first clock tree includes the $1^{st}$ Stage to $3^{rd}$ Stage, that is, "N" is 3.

Referring to FIG. 8, the $1^{st}$ Stage may be coupled between one input terminal and one output terminal. The $1^{st}$ Stage may include a first inverter coupled between the one input terminal and the one output terminal. In other words, the $1^{st}$ Stage may be allocated one output terminal per one input terminal. In this case, the $1^{st}$. Stage may output a first clock signal. The first dock signal may correspond to the at least one dock signal Vmixa<0:A> described above, that is, "A" is 0.

The $2^{nd}$ Stage may be coupled between one input terminal, which is coupled to the one output terminal of the $1^{st}$ Stage, and two output terminals. The $2^{nd}$ Stage may include first and second inverters coupled in parallel between the one input terminal and the two output terminals. In other words, the $2^{nd}$ Stage may be allocated two output terminals per one input terminal. In this case, the $2^{nd}$ Stage may output first and second dock signals. The first and second dock signals may correspond to the plurality of dock signals Vmixa<0:B>, respectively, described above, that is, "B" is 1.

The $3^{rd}$ Stage may be coupled between two input terminals, which are respectively coupled to the two output terminals of the $2^{nd}$ Stage, and six output terminals. The $3^{rd}$ Stage may include first to third inverters coupled in parallel between one of the two input terminals and three of the six output terminals, and fourth to sixth inverters coupled in parallel between the other input terminal and the other three output terminals. In other words, the $3^{rd}$ Stage may be allocated three output terminals per one input terminal. In this case, the $3^{rd}$ Stage may output first to sixth dock signals. The first to sixth dock signals may correspond to the plurality of dock signals Vmixa<0:K>, respectively, described above, that is, "K" is 5.

In an embodiment, each of the $1^{st}$ Stage to $3^{rd}$ Stage may include one inverter for each divaricate path, i.e., branch. However, the present disclosure is not limited thereto, and each of the $1^{st}$ Stage to $3^{rd}$ Stage may include two or more inverters, depending on design. For example, when each of the $1^{st}$ Stage to $3^{rd}$ Stage includes two or more inverters, the two or more inverters may be coupled in series. In addition, the number of paths branching from each of the $1^{st}$ Stage to $3^{rd}$ Stage may be variously changed according to design.

The plurality of first output drivers OD may be coupled between six input terminals, which are respectively coupled to the six output terminals of the $3^{rd}$ Stage, and 24 output terminals. The plurality of first output drivers OD may be allocated four output terminals per one input terminal. In this case, the plurality of first output drivers OD may output first to $24^{th}$ output dock signals Vmixa<0:23>. The first to $24^{th}$ output clock signals Vmixa<0:23> may correspond to the plurality of first output clock signals Vmixa<0:X>, respectively, described above, that is, "X" is 23.

In an embodiment, each of the plurality of first output drivers OD may include two inverters, coupled in series to each other, for each divaricate path, i.e., branch. However, the present disclosure is not limited thereto, and each of the first output drivers OD may include one inverter or three or more inverters coupled in series to one another, depending on design. In addition, the number of paths branching from each of the first output drivers OD may be variously changed according to design.

According to an embodiment, the output terminals of the plurality of first output drivers OD, that is, the 24 output terminals, may be divided into six groups according to first to sixth conductive lines La1 to La6 and the output terminals of the respective six groups may be coupled by the respective first to sixth conductive lines La1 to La6. The first to sixth conductive lines La1 to La6 may correspond to the sixth input terminals of the first output drivers OD, respectively. For example, the first conductive line La1 may be coupled in common to four output terminals from which first to fourth output clock signals Vmixa<0:3> are outputted, the second conductive line La1 may be coupled in common to four output terminals from which fifth to eighth output clock signals Vmixa<4:7> are outputted, the third conductive line La3 may be coupled in common to four output terminals from which ninth to $12^{th}$ output clock signals Vmixa<8:11> are outputted, the fourth conductive line La4 may be coupled in common to four output terminals from which $13^{th}$ to $16^{th}$ output clock signals Vmixa<12:15> are outputted, the fifth conductive line La5 may be coupled in common to four output terminals from which $17^{th}$ to $20^{th}$ output clock signals Vmixa<16:19> are outputted, and the sixth conductive line La6 may be coupled in common to four output terminals from which $21^{th}$ to $24^{th}$ output clock signals Vmixa<20:23> are outputted.

The first skew suppressor 145 may include first to fifth couplers CPa1 to CPa5. The first to fifth couplers CPa1 to CPa5 may be coupled between the first to sixth conductive lines La1 to La6, respectively. The first to fifth couplers CPa1 to CPa5 may selectively couple the first to sixth conductive lines La1 to La6 based on the first to fifth control signals ENa<0:4>, For example, the first coupler CPa1 may selectively couple the first and second conductive lines La1 and La2 to each other based on the first control signal ENa<0>, the second coupler CPa2 may selectively couple the second and third conductive lines La2 and La3 to each other based on the second control signal ENa<1>, the third coupler CPa3 may selectively couple the third and fourth conductive lines La3 and La4 to each other based on the third control signal ENa<2>, the fourth coupler CPa4 may selectively couple the fourth and fifth conductive lines La4 and La5 to each other based on the fourth control signal ENa<3>, and the fifth coupler CPa5 may selectively couple the fifth and sixth conductive lines La5 and La6 to each other based on the fifth control signal ENa<4>. Each of the first to fifth couplers CPa1 to CPa5 may include a switch or a fuse.

When two or more of the first to sixth conductive lines La1 to La6 are coupled by at least one of the first to fifth couplers CPa1 to CPa5, the timing skew occurring among the first to $24^{th}$ output clock signals Vmixa<0:23> may be suppressed by making substantially the same transition timings as some or all of the first to $24^{th}$ output clock signals Vmixa<0:23>.

For reference, since the plurality of first output drivers OD may have different RC delays reflected in respective branched paths and the respective inverters included in the plurality of output drivers OD may have different characteristics, for example, process and voltage variations, the timing skew may occur among the first to the $24^{th}$ output dock signals Vmixa<0:23>. However, since the 24 output terminals are coupled by the first to sixth conductive lines La1 to La6 and the first to sixth conductive lines La1 to La6 are selectively coupled by the first to fifth couplers CPa1 to CPa5 as described by way of example, the transition timings of the first to $24^{th}$ output clock signals Vmixa<0:23> may become almost the same. For example, among the plurality of first output drivers OD, a first output driver group that outputs output dock signals each having relatively fast transition timing and a second output driver group that outputs output dock signals each having relatively slow transition timing may collide or fight with each other during a period in which the timing skew occurs. When the first output driver group and the second output driver group collide with each other, the transition timings of the output clock signals outputted from the first output driver group may be relatively delayed, and the transition timings of the output signals outputted from the second output driver group may be relatively fast. Accordingly, the transition timings of the first to $24^{th}$ output clock signals Vmixa<0:23> may become almost the same.

According to an embodiment, the output terminals of the $3^{rd}$ Stage, that is, the six output terminals, may be divided into two groups according to seventh and eighth conductive lines La7 and La8 and the output terminals of the respective two groups may be coupled by the respective seventh and eighth conductive lines La7 and La8. The seventh and eighth conductive lines La7 and La8 may correspond to the two input terminals of the $3^{rd}$ Stage. For example, the seventh conductive line La7 may be coupled in common to three of the sixth output terminals, and the eighth conductive line La8 may be coupled in common to the other three output terminals.

The first skew suppressor 145 may further include a sixth coupler CPa6. The sixth coupler CPa6 may be coupled between the seventh and eighth conductive lines La7 and La8. The sixth coupler CPa6 may selectively couple the seventh and eighth conductive lines La7 and La8 to each other based on a sixth control signal ENa<5>, The sixth coupler CPa6 may include a switch or a fuse.

When the seventh and eighth conductive lines La7 and La8 are coupled by the sixth coupler CPa6, the timing skew occurring among the first to sixth dock signals outputted from the $3^{rd}$ Stage may be suppressed by making substantially the same transition timings as the first to sixth clock signals. The timing skew occurring among the first to sixth dock signals is suppressed, which makes it possible to suppress the timing skew occurring among the first to $24^{th}$ output dock signals Vmixa<0:23>.

According to an embodiment, the output terminals of the $2^{nd}$ Stage may be coupled in common by a ninth conductive line Lag, the six output terminals of the $3^{rd}$ Stage may be divided into two groups and the output terminals of the respective two groups may be coupled by the respective seventh and eighth conductive lines La1 and Lab, and the 24 output terminals of the first output drivers OD may be divided into six groups and the output terminals of the respective six groups may be coupled by the respective first to sixth conductive lines La1 to La6.

The first skew suppressor 145 may include first to sixth couplers CPa1 to CPa6. The first to fifth couplers CPa1 to CPa5 may be coupled among the first to sixth conductive lines La1 to La6, respectively. The first to fifth couplers CPa1 to CPa5 may selectively couple the first to sixth conductive lines La1 to La6 based on the first to fifth control signals ENa<0:4>. For example, the first coupler CPa1 may selectively couple the first and second conductive lines La1 and La2 to each other based on the first control signal ENa<0>, the second coupler CPa2 may selectively couple the second and third conductive lines La2 and La3 to each other based on the second control signal ENa<1>, the third coupler CPa3 may selectively couple the third and fourth conductive lines La3 and La4 to each other based on the third control signal ENa<2>, the fourth coupler CPa4 may selectively couple the fourth and fifth conductive lines La4 and La5 to each other based on the fourth control signal ENa<3>, and the fifth coupler CPa5 may selectively couple the fifth and sixth conductive lines La5 and La6 to each other based on the fifth control signal ENa<4>. The sixth coupler CPa6 may be coupled between the seventh and eighth conductive lines La7 and La8. The sixth coupler CPa6 may selectively couple the seventh and eighth conductive lines La7 and La8 to each other based on a sixth control signal ENa<5>. Each of the first to sixth couplers CPa1 to CPa6 may include a switch or a fuse.

When two or more of the first to sixth conductive lines La1 to La6 are coupled by at least one of the first to fifth couplers CPa1 to CPa5, the timing skew occurring among the first to $24^{th}$ output clock signals Vmixa<0:23> may be suppressed by making substantially the same transition timings of some or all of the first to $24^{th}$ output clock signals Vmixa<0:23>, When the seventh and eighth conductive lines La7 and La8 are coupled by the sixth coupler CPa6, the timing skew occurring among the first to sixth clock signals outputted from the $3^{rd}$ Stage may be suppressed by making substantially the same transition timings of the first to sixth clock signals. The suppressed timing skew occurring among the first to sixth clock signals may make it possible to suppress the timing skew occurring among the first to $24^{th}$ output clock signals Vmixa<0:23>.

Hereinafter, an operation of the image sensing device 100 having the above-described configuration is described as follows.

First, the operation of the image sensing device 100 is described according to a case where the phase controller 140 is configured as illustrated in FIGS. 3 to 5.

The phase controller 140 may generate a plurality of first output dock signals Vmixa<0:X> and a plurality of second output dock signals Vmixb<0:X>. The plurality of first output dock signals Vmixa<0:X> may have the same phase, the plurality of second output clock signals Vmixb<0:X> may have the same phase, and the plurality of first output clock signals Vmixa<0:X> and the plurality of second output clock signals Vmixb<0:X> may have different phases. For example, the plurality of first output dock signals Vmixa<0:X> and the plurality of second output dock signals Vmixb<0:X> may have a phase difference of 180 degrees. In particular, the phase controller 140 may suppress first timing skew occurring between the plurality of first output clock signals Vmixa<0:X> and second timing skew occurring between the plurality of second output clock signals Vmixb<0:X>.

For example, the phase controller 140 may suppress the first timing skew by coupling output terminals, from which the first output clock signals Vmixa<0:X> are outputted, or the distribution terminals related to the first output clock signals Vmixa<0:X> to at least one conductive line, for example, La1 to La3. The phase controller 140 may suppress the second timing skew by coupling output terminals, from which the second output clock signals Vmixb<0:X> are outputted, or the distribution terminals related to the second output dock signals Vmixb<0: X> to at least one conductive line, for example, La1 to La3.

The pixel array 150 may generate a plurality of pixel signals VPXs based on incident light RS, a plurality of row control signals CTRL<0:Y>, the plurality of first output dock signals Vmixa<0:X> and the plurality of second output dock signals Vmixb<0:X>.

The signal converter 170 may generate a plurality of digital signals DADCs based on the plurality of pixel signals VPXs, and the image processor 180 may generate the depth map information indicating a depth from the subject 200, based on the plurality of digital signals DADCs.

Next, the operation of the image sensing device 100 is described according to a case where the phase controller 140 is configured as illustrated in FIGS. 6 to 8.

The phase controller 140 may determine whether to activate each of the plurality of first control signals ENa<0:E>, according to the degree of the first timing skew occurring between the plurality of first output dock signals Vmixa<0:X>. The phase controller 140 may determine whether to activate each of the plurality of second control signals ENb<0:E>d, according to the degree of the second timing skew occurring between the plurality of second output dock signals Vmixb<0:X>. The degrees of the first and second timing skew may be determined through a test or simulation.

The phase controller 140 may generate the plurality of first output clock signals Vmixa<0:X> and the plurality of second output dock signals Vmixb<0:X>. The plurality of first output dock signals Vmixa<0:X> may have the same phase, the plurality of second output clock signals Vmixb<0:X> may have the same phase, and the plurality of first output clock signals Vmixa<0:X> and the plurality of second output clock signals Vmixb<0:X> may have different phases. For example, the plurality of first output dock signals Vmixa<0:X> and the plurality of second output dock signals Vmixb<0:X> may have a phase difference of 180 degrees. In particular, the phase controller 140 may suppress the first timing skew occurring between the plurality of first output clock signals Vmixa<0:X> and the second timing skew occurring between the plurality of second output clock signals Vmixb<0:X>.

For example, the phase controller 140 may suppress the first timing skew by coupling output terminals, from which the first output clock signals Vmixa<0:X> are outputted, or the distribution terminals related to the first output clock signals Vmixa<0:X> to at least one conductive line, for example, La1 to La9. The phase controller 140 may suppress the second timing skew by coupling output terminals, from which the second output clock signals Vmixb<0:X> are outputted, or the distribution terminals related to the second output clock signals Vmixb<0:X> to at least one conductive line, for example, La1 to La9 and the couplers CPa1 to CPa6.

The pixel array 150 may generate a plurality of pixel signals VPXs based on incident light RS, a plurality of row control signals CTRL<0:Y>, the plurality of first output dock signals Vmixa<0:X> and the plurality of second output dock signals Vmixb<0:X>.

The signal converter 170 may generate a plurality of digital signals DADCs based on the plurality of pixel signals VPXs, and the image processor 180 may generate the depth map information indicating a depth from the subject 200, based on the plurality of digital signals DADCs.

According to embodiments of the present disclosure, it is possible to suppress timing skew which occurs between dock signals due to RC delays of paths included in a dock tree and process and voltage (PV) variations of inverters included in the dock tree. In addition, the great timing skew occurs between nodal points, i.e., branch points or distribution points, of the clock tree. Thus, it is possible to flexibly adjust and suppress the timing skew by selectively controlling couplers.

According to embodiments of the present disclosure, it is possible to remove noise, for example, column fixed pattern noise, which occurs in a depth map, by suppressing the timing skew between dock signals used when a depth is measured.

While the present disclosure has been illustrated and described with respect to specific embodiments, the disclosed embodiments are provided by way of examples, and are not intended to be restrictive. Further, it is noted that the present disclosure may be achieved in various ways through substitution, change, and modification, as those skilled in the art will recognize in light of the present disclosure. The present disclosure encompasses all such variations that fall within the scope of the claims.

What is claimed is:

1. An image sensing device comprising:

a first clock distributor suitable for receiving a first input clock signal through a first input terminal, and outputting a plurality of first output clock signals through a plurality of first output terminals;

a plurality of first output drivers coupled to the plurality of first output terminal; and a first conductive line connecting to each of the plurality of first output terminals at respective positions between the plurality of first output drivers and the plurality of first output terminals.

2. The image sensing device of claim 1, wherein the first clock distributor includes:

a first clock tree coupled between the first input terminal and a plurality of first distribution terminals, wherein the plurality of first output drivers are coupled between the plurality of first distribution terminals and the plurality of first output terminals.

3. The image sensing device of claim 2, further comprising a second conductive line coupled in common to the plurality of first distribution terminals.

4. The image sensing device of claim 2, further comprising:

a plurality of second conductive lines coupled to a plurality of first groups, respectively, each of the first groups having a respective subset of the plurality of first distribution terminals; and a plurality of first couplers suitable for selectively coupling the plurality of second conductive lines based on a plurality of first control signals.

5. The image sensing device of claim 1, further comprising:

a second clock distributor suitable for receiving a second input clock signal, which has a different phase from the first input clock signal, through a second input terminal, and outputting a plurality of second output clock signals through a plurality of second output terminals; and a third conductive line coupled in common to the plurality of second output terminals.

6. The image sensing device of claim 5, wherein the second clock distributor includes:

a second clock tree coupled between the second input terminal and a plurality of second distribution terminals; and a plurality of second output drivers coupled between the plurality of second distribution terminals and the plurality of second output terminals.

7. The image sensing device of claim 6, further comprising a fourth conductive line coupled in common to the plurality of second distribution terminals.

8. The image sensing device of claim 6, further comprising:

a plurality of fourth conductive lines coupled to a plurality of second groups, respectively, each of the second groups having a respective subset of the plurality of second distribution terminals; and a plurality of second couplers suitable for selectively coupling the plurality of fourth conductive lines based on a plurality of second control signals.

9. The image sensing device of claim 1, further comprising a pixel array suitable for generating pixel signals, which correspond to depth map information, based on the plurality of first output clock signals and a light signal reflected from a subject.

10. An image sensing device comprising:

a first clock tree suitable for receiving a first input clock signal through a first input terminal, and outputting a plurality of first clock signals through a plurality of first distribution terminals;

a plurality of first output drivers suitable for receiving the plurality of first clock signals, and outputting a plurality of first output clock signals through a plurality of first output terminals; and a first conductive line connected to each of the plurality of first distribution terminals at respective positions between the plurality of first output drivers and the plurality of first distribution terminals.

11. The image sensing device of claim 10, further comprising:

a second clock tree suitable for receiving a second input clock signal, which has a different phase from the first input clock signal, through a second input terminal, and outputting a plurality of second clock signals through a plurality of second distribution terminals;

a second conductive line coupled in common to the plurality of second distribution terminals; and a plurality of second output drivers suitable for receiving the plurality of second clock signals, and outputting a plurality of second output clock signals through a plurality of second output terminals.

* * * * *